A. L. HANSEN.
UNLOADING DEVICE FOR TRUCKS AND THE LIKE.
APPLICATION FILED FEB. 3, 1913.

1,122,273.

Patented Dec. 29, 1914.
2 SHEETS—SHEET 1.

Witnesses:

Inventor:
Axel Ludwig Hansen
by Parker & Carter
his Atty's.

A. L. HANSEN.
UNLOADING DEVICE FOR TRUCKS AND THE LIKE.
APPLICATION FILED FEB. 3, 1913.

1,122,273.

Patented Dec. 29, 1914.
2 SHEETS—SHEET 2.

Inventor:
Axel Ludwig Hansen.

UNITED STATES PATENT OFFICE.

AXEL L. HANSEN, OF CHICAGO, ILLINOIS.

UNLOADING DEVICE FOR TRUCKS AND THE LIKE.

1,122,273.

Specification of Letters Patent.

Patented Dec. 29, 1914.

Application filed February 3, 1913. Serial No. 745,881.

*To all whom it may concern:*

Be it known that I, AXEL L. HANSEN, who was a subject of the King of Denmark, but who have made application for American citizenship, but not yet completed the formalities of becoming an American citizen, residing at Chicago, in the county of Cook and State of Illinois, have invented a certain new and useful Improvement in Unloading Devices for Trucks and the like, of which the following is a specification.

It is generally recognized that owing to the heavy cost of running and maintaining motor trucks and the like, their efficiency and economy depends in a very large degree on keeping them always in useful operation, and it is therefore imperative that the time spent in loading and unloading be kept to the lowest possible minimum.

In handling coal, stone and the like it is quite easy to fill the body or hopper on a truck through any of the well-known means. The problem, however, is to empty the hopper with equal speed, and a great many make-shifts have been employed. One method which has met with some degree of popularity is to mount the hopper on a frame so that it can be bodily raised above the truck frame and the material run off through a spout. Another way is to raise one end of the hopper and tip the material through the other end. A number of other ways have been tried, but found unsatisfactory in that they require a large amount of power. According to my invention I propose to do away with any moving or tipping or raising of the hopper, but will dump the hopper easily and rapidly and will still be able to have the hopper rigidly attached to the frame.

My invention is illustrated diagrammatically in the accompanying drawings, wherein—

Figure 1:
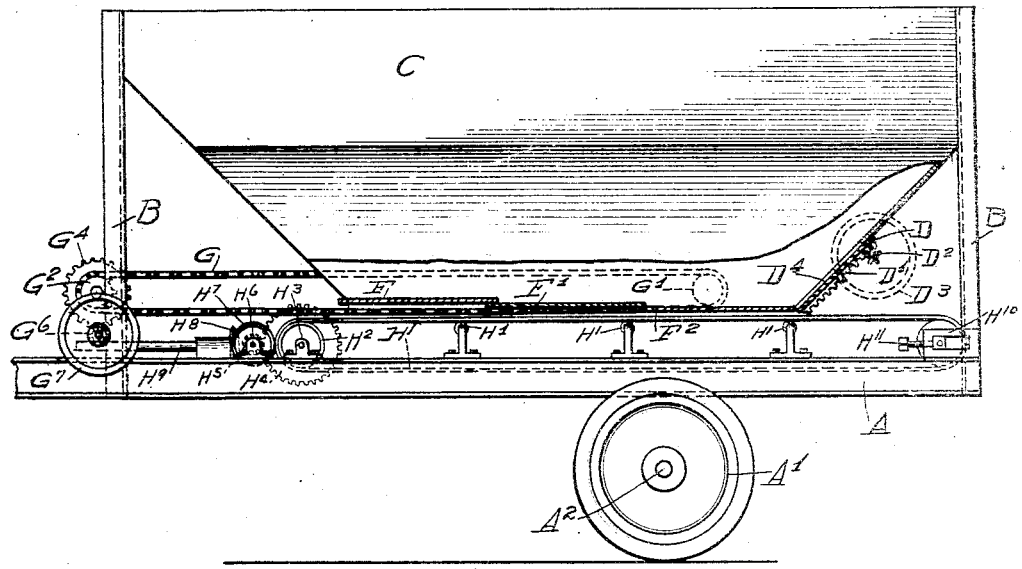
Figure 2:
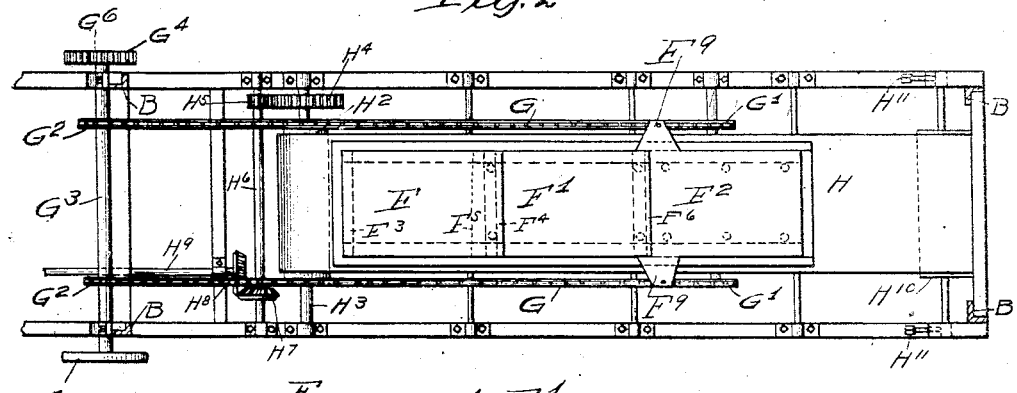
Figures 3, 4:
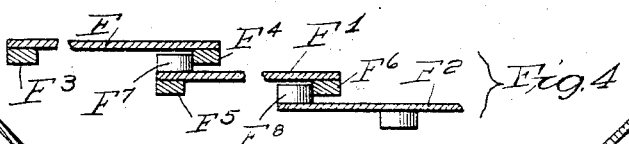
Figure 5:
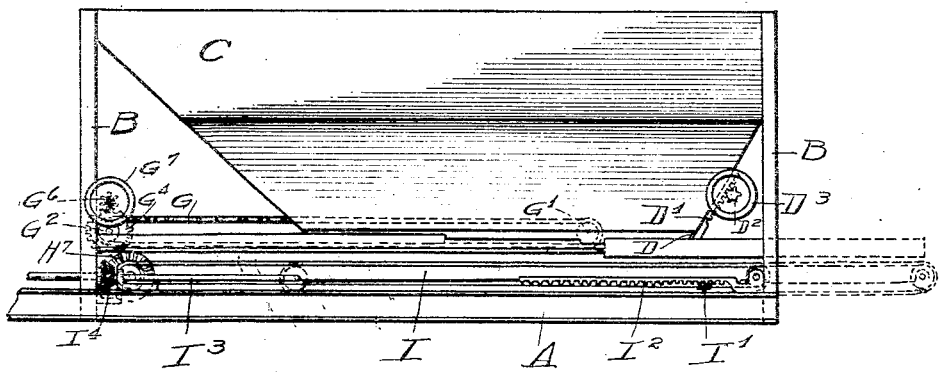
Figure 6:
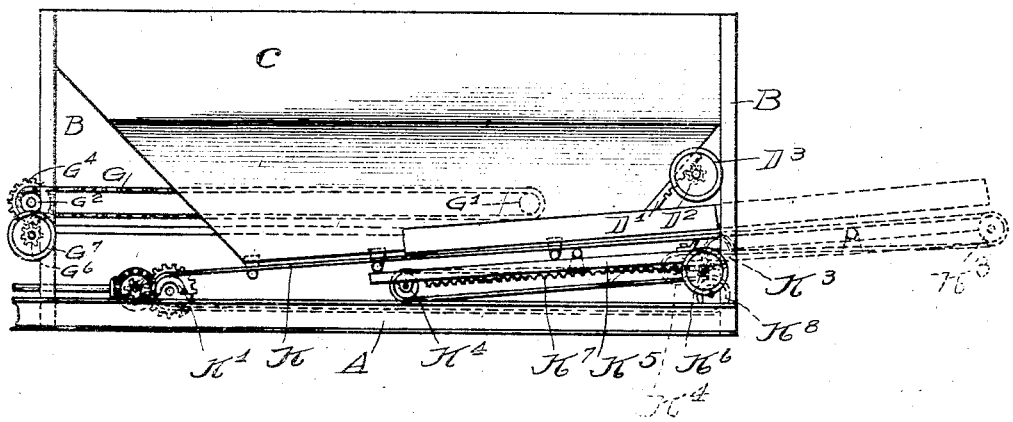

Figure 1 is a detail side elevation of a truck with parts in section and parts omitted; Fig. 2 is a detail plan view of a truck with parts omitted; Fig. 3 is a detail section through the bottom of the hopper showing the bottom in open position; Fig. 4 is a diagrammatic detail longitudinal section through the bottom showing the interaction of the bottom members. Fig. 5 is a detail side elevation of a modified form; Fig. 6 is a detail side elevation of a further modified form.

A is a truck frame.

$A^1$ is a rear supporting and driving wheel having an axle $A^2$ which supports the truck in any usual manner not shown.

B B are supports rigidly attached and projecting from the frame A.

C is a hopper having upper vertical walls and lower and inwardly inclined walls and an open bottom.

D is a sliding gate provided with a rack $D^1$ and adapted to be moved by the pinion $D^2$ in engagement with the rack and actuated by the hand wheel $D^3$ to open or close the opening $D^4$ in the rear panel of the inclined wall.

E E are angle frames reinforcing the lower edges of the inclined hopper walls.

$E^1$ $E^1$, $E^2$ $E^2$ are spacing and track forming members respectively.

The bottom of the hopper is made up of the three slidably mounted panels F, $F^1$ and $F^2$ which are located in the space as indicated in Fig. 4. The panels F and $F^1$ are provided at either end with downwardly projecting members $F^3$, $F^4$, $F^5$ and $F^6$. The panels $F^1$ and $F^2$ are provided each at one end with the projecting lugs $F^7$, $F^8$, projecting upwardly into the path of the members $F^3$, $F^4$, $F^5$ and $F^6$ respectively. The panel $F^2$ is provided with the outwardly projecting flanges $F^9$ $F^9$ which overlie the frame $E^3$ and project outwardly on either side beyond it.

The sprocket chains G G ride over the idler sprocket wheels $G^1$ $G^1$ and driving sprocket wheels $G^2$ $G^2$ which are mounted on the shaft $G^3$ which carries the gear $G^4$ in mesh with the pinion $G^5$, actuated by the hand wheels $G^7$. The flanges $F^9$ are attached to the chains G on either side of the hopper.

The conveyer H travels on the supporting rolls $H^1$ beneath the bottom of the hopper and passes over the head roller $H^2$ mounted on the shaft $H^3$ and driven by the gear $H^4$, pinion $H^5$, shaft $H^6$, miter gear $H^7$ $H^8$ and drive shaft $H^9$ driven from any usual truck motor not shown. The belt or conveyer H rides on the roller $H^{10}$ which is adjustable in position by means of the screw $H^{11}$ to vary the tension of the conveyer belt.

In the further modification illustrated in Fig. 6, the conveyer belt K passes over the head roller $K^1$ driven from the engine in identically the same manner as shown in Fig. 1. The belt also travels over the rollers $K^3$ $K^4$ on the sliding frame $K^5$ which sliding frame is adapted to be forced in or out by means of the pinion $K^6$ in mesh with the rack $K^7$. The belt leads from the roller $K^4$ to the roller $K^8$ on the frame A.

It will be obvious that the operator by moving the slidable frame out will move the pulley $K^3$ farther away from the pulley or roller and bring the pulley $K^4$ closer to the fixed roller $K^8$, thus extending the conveyer and causing it to project out from the rear of the truck.

It will be evident that while I have shown in my drawings an operative device, still many changes might be made in size, shape and arrangement of parts without departing materially from the spirit of my invention, and I wish therefore, that my drawings be regarded as in a sense diagrammatic.

I claim:

1. The combination with a motor truck having a hopper body thereon of a conveyer mounted on the truck and adapted to receive the material from the hopper body and discharge it from the truck, a horizontal sliding bottom door for the hopper and means for progressively opening said door in a direction opposed to the feeding direction of the conveyer, a door in the rear side wall of the hopper bottom immediately above the conveyer and means for opening said door.

2. The combination with a motor truck having a hopper body thereon of a conveyer mounted on the truck and adapted to receive the material from the hopper body and discharge it from the truck, a horizontal sliding bottom door for the hopper and means for progressively opening said door in a direction opposed to the feeding direction of the conveyer, a door in the rear side wall of the hopper bottom immediately above the conveyer and means for opening said door, and a connection between the motor and the conveyer whereby the conveyer may be driven therefrom.

3. The combination with a motor truck having a hopper body thereon of a conveyer mounted on the truck and adapted to receive the material from the hopper body and discharge it from the truck, a horizontal sliding bottom door for the hopper and means for progressively opening said door in a direction opposed to the feeding direction of the conveyer, and a connection between the motor and the conveyer whereby the conveyer may be driven therefrom.

Signed at Chicago, Illinois, this 23rd day of January 1913.

AXEL L. HANSEN.

Witnesses:
MINNIE M. LINDENAU,
LAUREL M. DOREMUS.